United States Patent [19]
Carroll

[11] 3,819,289
[45] June 25, 1974

[54] STRUCTURE FOR DETACHABLY SECURING A MEMBER CONCENTRICALLY TO A HIGH SPEED SHAFT

[75] Inventor: Alexander A. Carroll, Greensburg, Pa.

[73] Assignee: Carrier Corporation, Syracuse, N.Y.

[22] Filed: Sept. 1, 1972

[21] Appl. No.: 285,707

[52] U.S. Cl. .............................. 403/259, 403/360
[51] Int. Cl. ............................................. F16d 1/06
[58] Field of Search .......... 403/259, 261, 289, 290, 403/360, 254, 344

[56] References Cited
UNITED STATES PATENTS

| | | | |
|---|---|---|---|
| 276,287 | 4/1883 | Rominger | 403/344 |
| 298,317 | 5/1884 | Sherman | 403/261 |
| 1,673,738 | 6/1928 | Dibner | 403/290 |
| 1,739,286 | 12/1929 | Bronson | 403/261 |
| 2,089,410 | 8/1937 | Olson | 403/254 |
| 2,513,970 | 7/1950 | Sisulak | 403/259 |

Primary Examiner—George H. Krizmanich
Attorney, Agent, or Firm—J. Raymond Curtin

[57] ABSTRACT

A functional member, such as a thrust collar, is formed with a hub having a bore for a light push fit on a shaft journaled for high speed rotation. The annular end surfaces of the hub are beveled outwardly toward the center of the hub. A shoulder surface is fixed to the shaft for engagement by one end surface of the hub. Hub engaging means, having a threaded connection with the shaft, is provided for engaging the opposite ends of the hub and, by virtue of the threaded connection with the shaft, is movable axially of the shaft whereby the hub is forcibly clamped between the fixed shoulder on the shaft and the hub engaging means and is maintained in concentric relation to the shaft.

4 Claims, 1 Drawing Figure

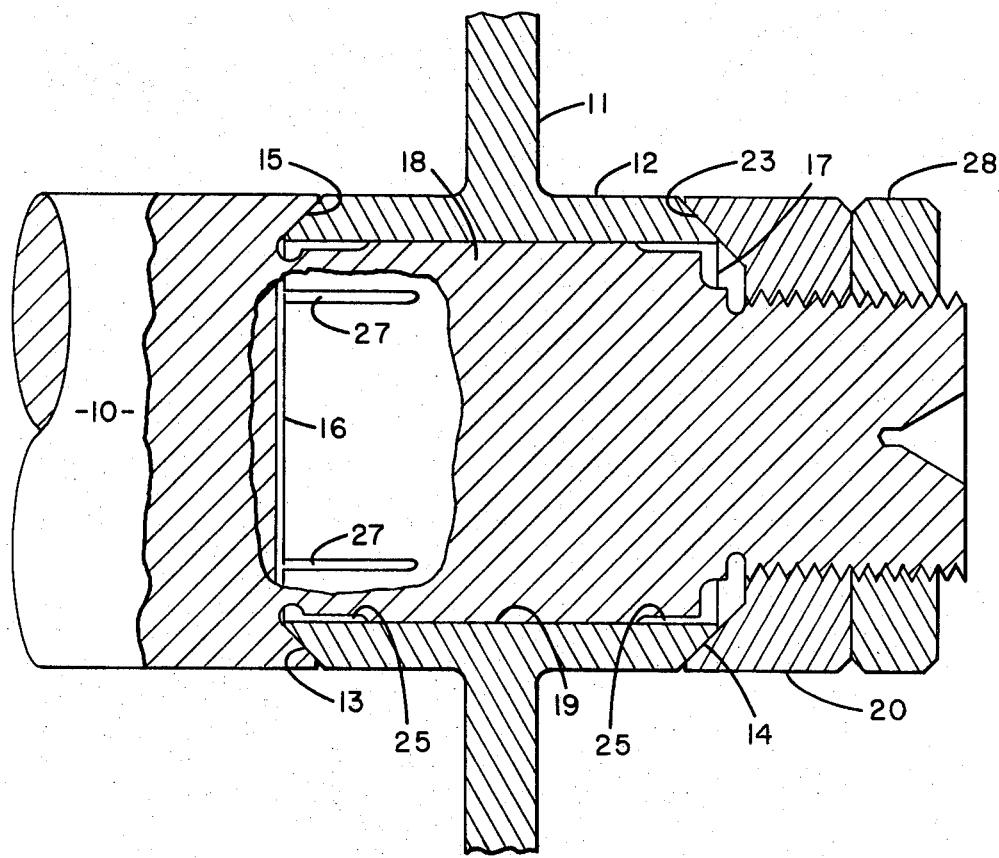

STRUCTURE FOR DETACHABLY SECURING A MEMBER CONCENTRICALLY TO A HIGH SPEED SHAFT

BACKGROUND OF THE INVENTION

In some machine structures, it is necessary on occasion to replace a functional member mounted on a high speed rotating shaft. An example of such a member is a thrust collar cooperable with a thrust bearing. The thrust collar must be mounted concentric with the shaft and free from wobble. Conventionally, these requirements are met by forming the bore of the collar for a tight press fit on the shaft. As is well known, tight press fits require precision machining of the parts, which is an expensive operation. Furthermore, it is often difficult to assemble the machine elmements where a high pressure press fit is required on a thrust collar. By the same token, it is difficult and costly to remove an element mounted on a shaft with a high press fit.

Attempts have been made to mount such a member on a shaft wherein the parts are formed with only a light push fit. A thrust collar, for example, is mounted in such manner, being clamped between a radial shoulder and a washer and nut. However, due to the high strains involved in the high speed rotation of the parts, a thrust collar so mounted does not maintain concentricity with the shaft and the radial portion of the collar may wobble, adversely affecting its usefulness in a thrust bearing combination.

This invention has as an object a structural arrangement for mounting a functional element on a high speed rotating shaft, the element initially bored for a light push fit with the shaft.

SUMMARY OF THE INVENTION

The hub of the thrust collar or such member is formed with a hub bored for a light push fit with the shaft. The ends of the hub are beveled. The shaft is formed or provided with a shaft shoulder surface beveled comparable to one end of the hub portion. The opposite end of the hub portion is engaged by means also having an annular surface beveled comparable to the opposite end of the hub, and having threaded connection with the shaft, whereby, upon tightening the hub engaging member, the hub portion is clamped by the fixed shoulder on the shaft and the hub engaging member and the beveled surfaces are such to contract the hub inwardly against the shaft.

BRIEF DESCRIPTION OF THE DRAWING

The drawing is a lengthwise sectional view, with parts broken away, of a shaft with a thrust collar mounted thereon, according to my invention.

DESCRIPTION OF THE PREFERRED EMBODIMENT

In reference to the drawing, 10 designates a shaft constituting a component of a machine structure. The shaft 10 may be the shaft on which the impellers of a centrifugal compressor are mounted. In such machine, the shaft is rotated at high speed and is subjected to axial thrust of considerable magnitude.

This invention is directed to the mounting of a functional element on the shaft 10, and as here illustrated, the functional element consists of a thrust collar 11 having a hub 12. The hub 12 is bored for a light press fit on the shaft 10. The hub 12 is formed with annular end surfaces 13, 14. These beveled surfaces incline rearwardly from a small diameter at the end faces 16 and 17 of the hub towards a larger diameter formed in the main body thereof. As shown in the drawing, the shaft 10 is provided with a cylindrical portion 18 being arranged to accept in mounting relationship therewith a complementary bore 19 formed within the body of hub 12.

The shaft 10 is provided with an annular shoulder surface 15 which is inclined at an angle comparable to the beveled end surface 13 of the hub 12. The annular shoulder surface 15 is preferably formed integral with the shaft 10.

The opposite end surface 14 of the hub 12 is engaged by means having threaded connection with the shaft 10 and which is operable to move the hub 12 axially on the shaft 10 against the shoulder 15.

The hub engaging means illustrated consists of a nut member 20 threaded on the shaft 10 and being formed with an annular surface 23 inclined on an angle comparable to the beveled end 14 of the hub 12. As the nut 20 is tightened on the shaft 10, it is moved into engagement with the end surface 14 of the hub 12 and effects axial movement of the hub 12 for engagement of the end surface 13 thereof with the shaft shoulder surface 15. The beveled end surfaces 13, 14 of the hub 12 and the comparable inclined shoulder surface 15 and nut surface 23 effect inward radial contraction of the hub 12 against the shaft 10 and fix the hub 12 thereto in concentric relation therewith.

Preferably, the shaft is formed with areas 25 of reduced diameter. These areas are located radially inwardly of each end portion of the hub. These clearances permit the end portions of the hub to be stressed inwardly when the nut 20 is tightened on the shaft. Accordingly, the hub 12 does not become loose on the shaft due to centrifugal or thermal changes in the structure during operation of the machine. The thrust collar is maintained concentric with the shaft during the operation of the machine.

The end portions of the hub may be formed with axially extending slots 27 to provide greater flexibility in the end portions of the hub for inward contraction by the cooperating beveled surfaces. A jam nut 28 may be employed to retain the hub engaging nut 20 in tightened condition.

While I have described the preferred embodiments of my invention, it is to be understood that the invention is not limited thereto, but may be otherwise embodied within the scope of the following claims.

I claim:

1. In combination, a shaft journaled for rotation and structure for fixedly mounting a member in concentric relation to said shaft, said shaft being formed with a cylindrical portion, said member having a hub portion mounted on said cylindrical shaft portion and being formed with a bore dimensioned for a push fit thereon, said hub further being formed with opposed annular end surfaces inclined rearwardly from a small diameter at the end faces of said hub towards a larger diameter formed in the main body of the hub, said shaft being provided with an annular shoulder surface fixed against axial movement and disposed contiguous to one end surface of said hub, said fixed shoulder surface being inclined comparable to said one end surface of said hub, said hub engaging means having threaded connection with said shaft and including an annular surface confronting the other of said end surfaces of said hub and being inclined comparable thereto, said hub engaging means being operable through the hub to forcibly move said one end surface of said hub against said fixed shoulder surface.

2. The combination according to claim 1 wherein said shaft annular shoulder surface is formed integral with said shaft.

3. The combination according to claim 1 wherein said hub engaging means consists of a nut member threaded on said shaft and formed with said annular hub engaging surface.

4. The combination according to claim 1 wherein said shaft is formed with an area of reduced diameter radially inward of each end portion of said hub.

* * * * *